United States Patent [19]

Schindler

[11] Patent Number: 4,999,106

[45] Date of Patent: Mar. 12, 1991

[54] APPARATUS FOR MAGNETICALLY CONDITIONING A LIQUID

[75] Inventor: Robert H. Schindler, Bellmund, Switzerland

[73] Assignee: Liquitech Holding S.A., Luxembourg

[21] Appl. No.: 367,444

[22] Filed: Jun. 16, 1989

[30] Foreign Application Priority Data

Jul. 22, 1988 [LU] Luxembourg .............................. 87289

[51] Int. Cl.$^5$ ............................................................ C02F 1/48
[52] U.S. Cl. ..................................... 210/222; 210/223
[58] Field of Search ........................ 210/222, 223, 695

[56] References Cited

U.S. PATENT DOCUMENTS

| | | | |
|---|---|---|---|
| 2,789,655 | 4/1957 | Michael et al. | 210/223 |
| 2,915,186 | 12/1959 | Johannesen | 210/223 |
| 3,343,676 | 9/1967 | Tyrrell | 210/233 |
| 4,278,549 | 7/1981 | Abrams et al. | 210/222 |
| 4,289,621 | 9/1981 | O'Meara, Jr. | 210/222 |
| 4,731,186 | 3/1988 | Belasco | 210/223 |

FOREIGN PATENT DOCUMENTS

| | | | |
|---|---|---|---|
| 495329 | 4/1978 | Canada. | |
| 1011550 | 4/1983 | U.S.S.R. | 210/222 |

*Primary Examiner*—W. Gary Jones
*Assistant Examiner*—Matthew Savage
*Attorney, Agent, or Firm*—Thomas S. Baker, Jr.

[57] ABSTRACT

An apparatus for magnetically treating a liquid is disclosed herein. The apparatus includes at least two magnetized inserts mounted in a pipe containing a liquid to be treated. The inserts are disposed parallel to one another and parallel to the direction of flow of the liquid to be treated wherein each of the inserts includes a plurality of successive permanent magnets abutting each other and positioned such that the magnetic flux of each magnet is perpendicular to the direction of fluid flow, wherein the polarity of adjacent magnets of an insert alternates in direction, and wherein each magnetic insert is located opposite an identically polarized magnet in an adjacent insert.

8 Claims, 2 Drawing Sheets

APPARATUS FOR MAGNETICALLY CONDITIONING A LIQUID

BACKGROUND TO THE INVENTION

The subject of the present invention is a liquid conditioning element with a magnetic disincrustant action.

Water conditioning devices with magnetic disincrustant action are known per se and, typically, consist of a stack of ring-shaped magnets set in a fixture longitudinally traversed by the flow of water to be treated.

Although the precise mechanism of operation of such apparatuses is not yet fully understood, their efficacy is acknowledged, being easy to verify by measuring and comparing the amount of scale deposited on pipes with or without the use of a conditioning device.

It appears, in fact, that these devices act mainly on calcium and magnesium to prevent them from being precipitated in an incrusting form on the walls of pipes and so that they are instead precipitated in pulverulent form, the powder thus formed being removed by the stream of water being treated.

It is the object of the present invention to improve the performance of such devices by a novel arrangement of the magnetic elements thereof.

SUMMARY OF THE INVENTION

The invention comprises a liquid conditioning element with a magnetic disincrustant action, characterised by comprising, fitted on a pipe containing a liquid with a tendency to deposit scale thereon, at least one sequence of magnetized inserts disposed parallel to one another and parallel to the direction of flow of the liquid to be grated, each of said inserts comprising a plurality of magnetized zones such that the magnetic flux is perpendicular to their plane and alternates in direction from one zone to the next, each zone of an insert being located opposite an identically polarized zone of the adjacent inserts.

BRIEF DESCRIPTION OF THE DRAWINGS

The drawings show an exemplifying embodiment of the subject-matter of the invention and variant thereof.

DETAILED DISCLOSURE OF THE PREFERRED EMBODIMENT

Figure 1:
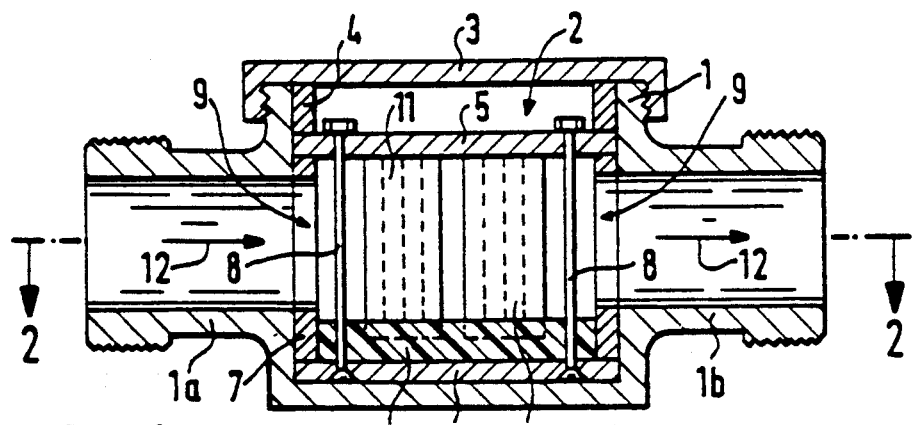
FIG. 1 is a diametral section through a water conditioning element fixed on a pipe.
Figure 2:
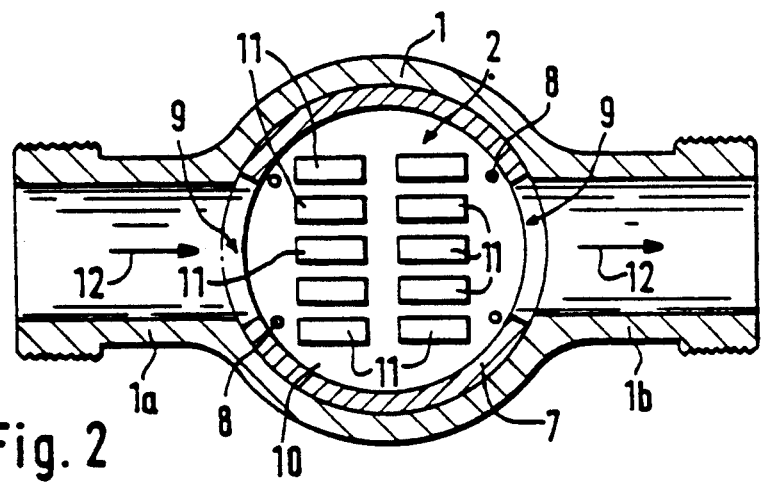
FIG. 2 is a section taken along line II—II in FIG. 1.

The conditioning device represented in FIGS. 1 and 2 comprises a body 1, equipped wth an inlet nozzle 1a for the water to be treated and with an outlet nozzle 1b, in which is set a cartridge 2 held in place by a lid 3 which screws onto the body 1, with a ring 4 interposed therebetween to act as a spacer.

The cartridge 2 constitutes the conditioning element with magnetic disincrustant action. Said cartridge comprises a cage-type supporting member made up of two circular plates 5 and 6, of non-magnetic material, which are held spaced apart from one another by a cylindrical spacer 7 and joined by ties 8. This spacer 7 has two circular openings 9, respectively situated opposite the two nozzles 1a and 1b. A base plate 10, likewise made from a non-magnetic material, for example plastic, rests on the lower plate 6 of the supporting member.

Magnetic inserts 11 made, for example, from a samarium cobalt rare earth, and stuck in the base plate 10, form two rows, in each of which they are disposed parallel to one another and parallel to the flow of the water circulating in the device, as indicated by arrows 12 in FIGS. 1 and 2. The distance separating the inserts 11 from one another corresponds substantially to the thickness thereof.

Figure 3:
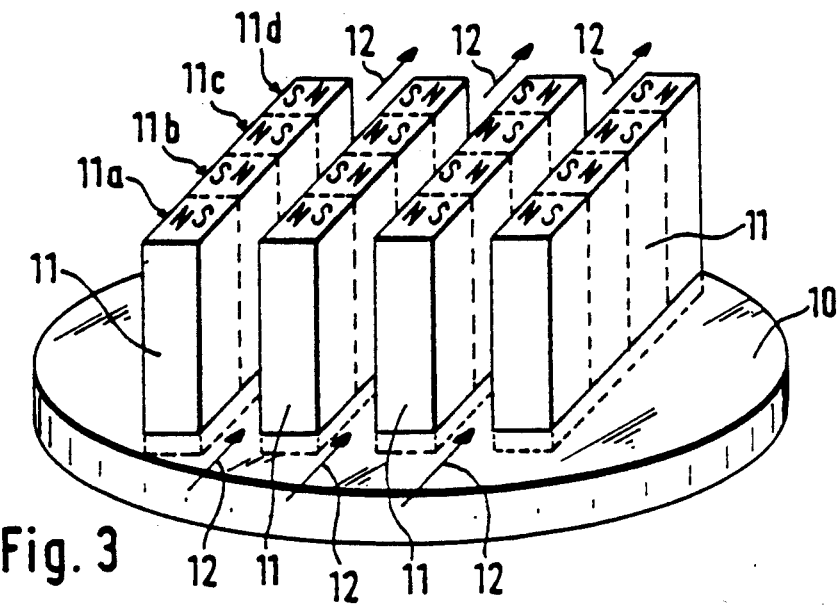
FIG. 3 is a schematic perspective view of part of a conditioning element of the type shown in FIGS. 1 and 2 and FIG. 4 is a section through a water filtering device combined with the present conditioning element.

These inserts, which are shown in detail in FIG. 3, are magnetized in a direction perpendicular to their plane. In addition, they are divided into successive zones or bands, designated by 11a, 11b, 11c and 11d, in each of which the polarity of the magnetization is reversed. Thus, for instance, in zone 11a the North is located on the left in FIG. 3 and the South on the right, while in zone 11b the South is on the left and the North on the right, zone 11c being the same as zone 11a and zone 11d the same as zone 11b.

All these inserts are identical, with the result that each zone of an insert is located opposite an identically polarized zone of the adjacent inserts.

Experiments have shown that this particular arrangement of inserts greatly improves the efficiency of the device, the disincrustant action of which considerably reduces scale deposit in pipes and consequently corrosion thereof.

Figure 4:
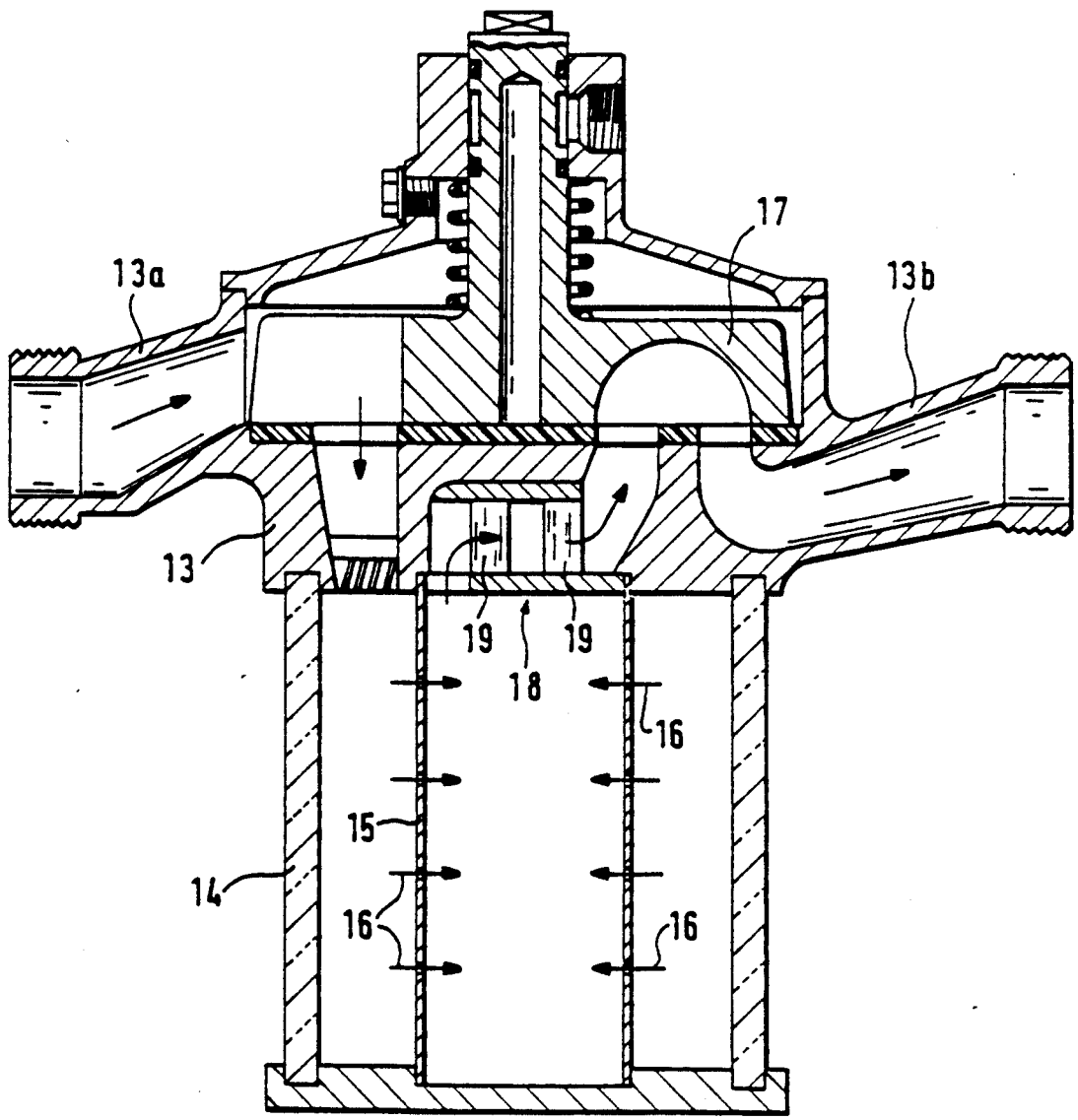

In the variant shown in FIG. 4, the pipe in which the disincrustant element is disposed is a water filter, not described in detail here, which has a body 13 equipped with an admission nozzle 13a and an outlet nozzle 13b, below which body is fixed a cylindrical part 14, inside which is disposed a cylindrical filter 15, which the water enters radially as indicated by arrows the 16.

The body 13 contains a mobile plug 17, whose function will not be described in detail here, being outside the scope of the invention, but which, according to the position that it adopts, either enables normal flow of the water passing from the admission nozzle 13a to the outlet nozzle 13b by way of the cylindrical filter 15 (the position shown in the drawings), or else a reversed position in which the water flows in the reverse direction, passing through the filter 15 from the inside to the outside in order to scour the latter.

The outlet end of the filter 15 is equipped with a disincrustant cartridge 18 comprising magnetized inserts 19, which form two rows, identical to those shown in detail in FIG. 3, parallel to one another and parallel to the flow of water leaving the device.

The device therefore simultanteously filters the water and conditions it in a disincrustant manner.

It should be noted that, in the element which constitutes the subject-matter of the present invention, the number of rows of inserts and the number of inserts per row may vary from the numbers in the example and variant illustrated.

By the same token, the element may be used to treat liquids other than water, for example wine, milk, etc..

Finally, it should also be noted that the inserts may be manufactured from one piece or produced in a plurality of juxtaposed elements, each of which represents a polarised zone of the insert.

I claim:

1. A liquid conditioning element having a magnetic disincrustant action, comprising at least two magnetized inserts mounted in a pipe containing a liquid to be treated wherein said inserts are disposed parallel to one another and parallel to the direction of flow of the liquid to be treated; wherein each of said inserts comprises a plurality of successive permanent magnets abutting each other which are positioned such that the magnetic flux of each magnet is perpendicular to the direction of liquid flow and the polarity of adjacent magnets of an insert alternates in direction, and wherein each magnet insert is located opposite an identically polarized magnet in an adjacent insert.

2. A liquid conditioning element according to claim 1, comprising a plurality of rows of inserts following one another in the direction of flow of the liquid to be treated.

3. A liquid conditioning element according to claim 1, wherein said permanent magnets of said inserts have one end affixed to a supporting member and constitute with the latter a cartridge fitted as a unit in the pipe through which the liquid to be treated passes.

4. A liquid conditioning element according to claim 1, wherein said inserts are located in a liquid filtering device.

5. A liquid conditioning element according to claim 4, wherein said liquid filtering device includes a cylindrical filter entered radially by the liquid to be filtered and the inserts are located at an outlet end of said cylindrical filter.

6. The liquid conditioning element of claim 1 in which each of said magnets are constructed of a single material.

7. The liquid conditioning element of claim 6 in which said single material is samarium cobalt rare earth.

8. The liquid conditioning element of claim 1 further comprising:
a first plate;
a second plate;
spacer means for spacing said first plate from said second plate;
wherein said magnetic inserts have one end rigidly affixed to a surface one of said first or second plates; and
joining means for joining said first plate, said second plate and said spacer means together.

* * * * *